United States Patent [19]

Yamaguchi et al.

[11] Patent Number: 4,617,226

[45] Date of Patent: Oct. 14, 1986

[54] MAGNETIC RECORDING MEDIUM

[75] Inventors: Nobutaka Yamaguchi; Masahiro Utumi; Masaaki Fujiyama; Takahito Miyoshi, all of Kanagawa, Japan

[73] Assignee: Fuji Photo Film Co., Ltd., Kanagawa, Japan

[21] Appl. No.: 642,911

[22] Filed: Aug. 21, 1984

[30] Foreign Application Priority Data

Aug. 22, 1983 [JP] Japan ................ 58-152963

[51] Int. Cl.⁴ .............................................. G11B 5/72
[52] U.S. Cl. ..................................... 428/216; 360/134; 360/135; 360/136; 427/128; 427/131; 428/336; 428/323; 428/408; 428/411.1; 428/694; 428/900
[58] Field of Search ............... 428/694, 328, 329, 922, 428/900, 411.1, 408, 336, 216, 323; 427/131, 128; 360/135, 134, 136

[56] References Cited

U.S. PATENT DOCUMENTS

| | | | |
|---|---|---|---|
| 3,446,651 | 5/1969 | Clachan | 428/922 |
| 4,210,703 | 7/1980 | Scantlin | 427/131 |
| 4,275,113 | 6/1981 | Saito | 428/900 |
| 4,433,113 | 2/1984 | Woodward | 428/92 |
| 4,528,240 | 7/1985 | Miyoshi | 428/328 |

*Primary Examiner*—Ellis P. Robinson
*Attorney, Agent, or Firm*—Sughrue, Mion, Zinn, Macpeak & Seas

[57] ABSTRACT

A novel magnetic recording medium comprising a non-magnetic support, a magnetic recording layer, and an intermediate layer containing an electroconductive polymer. An optional second intermediate layer contains carbon black and is provided on either surface of the first intermediate layer. The magnetic recording medium has low surface electric resistance, and when used as a video tape, has both a high video S/N ratio and improved stability of video S/N with the passage of time.

12 Claims, No Drawings

MAGNETIC RECORDING MEDIUM

FIELD OF THE INVENTION

The present invention relates to a magnetic recording medium, and more particularly it relates to a magnetic recording medium having reduced surface electric resistance and improved recorded signal stability with the passage of time.

BACKGROUND OF THE INVENTION

A magnetic recording tape is usually composed of a polyester support having provided thereon a magnetic recording layer which contains magnetic particles, a binder and various additives. Such a magnetic recording tape has high surface electric resistance because of the high electric resistance of the magnetic particles used and because of electrically insulating materials which are generally employed for preparing the tape, and is easily electrostatically charged by abrasion. The electrostatic charge attracts dust to the surface of the magnetic recording tape, leading to an undesirable increase in the coefficient of static friction, to deformation of the wound shape of the magnetic recording tape and to decreased running properties.

It has been proposed to decrease the surface electric resistance of magnetic recording tapes by incorporating electroconductive substances such as carbon black or an anionic, cationic, nonionic or ampholytic surface active agent into the magnetic recording layer. However, the addition of electroconductive substances in an excess amount results in decreased magnetic flux density and decreases the sensitivity of the magnetic recording medium, and the addition of a surface active agent in an excess amount reduces running properties and makes the medium sticky.

To solve this problem it has been proposed to provide an intermediate layer between the support and the magnetic recording layer and to incorporate into the intermediate layer carbon black, as disclosed in Japanese Patent Application (OPI) No. 55433/80 (the term "OPI", as used herein, refers to a "published, unexamined Japanese Patent Application") and U.S. Pat. No. 3,440,091, and a quarternary ammonium salt which is disclosed in Japanese Patent Application (OPI) No. 60536/82. However, carbon black has a poor dispersibility because of its fine particle size, and its addition decreases the surface smoothness of the intermediate layer. Because of the poor surface smoothness of the intermediate layer, the magnetic recording layer provided thereon also has poor surface smoothness. This poor surface smoothness is a very serious problem in short wavelength recording systems such as VHS or Beta video tape systems, where it causes a decreased video S/N ratio and poor image quality.

If a quarternary ammonium salt is included in an intermediate layer, less of the quarternary ammonium salt exudes to the surface of the magnetic recording layer than if the quarternary ammonium salt is included in the magnetic recording layer. However, this type of surface active agent inherently migrates in the layer, and moves from the intermediate layer through the magnetic recording layer to finally reach the surface of the magnetic recording layer. This leads to decreased video S/N and adversely affects the efficiency of the magnetic recording medium.

SUMMARY OF THE INVENTION

A primary object of the present invention is to reduce the surface electric resistance of the magnetic recording layer of a magnetic recording medium.

Another object of the present invention is to improve the video S/N ratio of a magnetic recording medium.

Still another object of the present invention is to improve the stability of video S/N with the passage of time.

It has now been found that these and other objects of the invention are attained by incorporating an electroconductive polymer into an intermediate layer, and that by this means electrostatic charging can be prevented without reducing the surface smoothness of the magnetic recording layer, and without exudation of the polymer onto the surface of the magnetic recording layer.

DETAILED DESCRIPTION OF THE INVENTION

The present invention relates to a magnetic recording medium comprising a non-magnetic support, a magnetic recording layer and an intermediate layer provided therebetween, the intermediate layer containing an electroconductive polymer.

The electroconductive polymer used in the present invention is not unduly limited, and can be freely selected from such polymers known in the art. Typical electroconductive polymers which may be used in the present invention include, for example, ion-conductive high molecular electrolytic compounds, conjugated $\pi$ electron electron-conductive high molecular compounds, and charge transfer high molecular complex compounds. Any one of those compounds can be used in the present invention.

These compounds are described in detail in *Kinoosei Kobunshi*, Chap. 7, published by Kyoritsu Shuppan, July 20, 1974 (Initial version), A. Rembaum and R. F. Landel, *Electrical Conduction Properties of Polymers*, published by Interscience Public New York (1967), J. E. Katon, *Organic Semiconducting Polymers*, published by Marcel Dekker Inc., New York (1968), K. C. Frisch and A. V. Patsis, *Electrical Properties of Polymers*, published by Technomic Pub. Westport, Conn. (1972), A. Rembaum, *Encycl. Polym. Sci. Technol.*, 11, 318 (1969) and *J. Polymer Sci.*, Part C, 29,157 (1970).

Specific examples of ion-conductive high molecular electrolytic compounds include "Gose Fimer-C-620, C-670, C-680, C-800 (cationic), A-460 and A-720 (anionic)" manufactured by Nihon Gosei Kagaku Kogyo Co., Ltd., "ECR-34" and "ECR-77: (cationic), manufactured by Dow Chemical Co., Ltd., "Chemistat 6300" (cationic), manufactured by Sanyo Kasei Kogyo Co., Ltd., and "IPK-1002" (ionene) manufactured by Hokuetsu Seishi Co., Ltd. Typical examples of charge transfer high molecular complex compounds include a high molecular polycation-7,7,8,8-tetracyanoquinodimethane (TCNQ) salt complex compound and an amino or pyridine charge transfer high molecular TCNQ complex compound disclosed in the above-described *Kinoosei Kobunshi* in Chapter 7. A typical example of conjugated $\pi$ electron electron-conductive high molecular compounds is polyacetylene.

The intermediate layer of the present invention generally contains the electroconductive polymer in an amount of about 30 wt% or more, preferably about 50 wt% or more, particularly preferably about 80 to 100 wt%, based on the weight of the intermediate layer. If desired, carbon black and graphite can be included in a small amount, i.e., about 0.01 to 20 wt% and preferably about 1 to 5 wt%, in the intermediate layer of the invention to improve the electrostatically charge-preventing effect. The particle size of these additives is generally not more than about 3 μm, preferably about 0.01 to 0.1 μm and more preferably about 0.015 to 0.05 μm. Other electroconductive inorganic pigments such as ZnO and TiO may be added in place of carbon black or graphite where the intermediate layer is desired to be white or pale color.

Solvents such as water or an organic solvent, binders and curing agents which are generally employed for the preparation of a magnetic recording medium can be selected depending upon the properties of the electroconductive polymer to be used.

The intermediate layer according to the invention has a dry thickness of about 0.005 to 5 μm, preferably about 0.01 to 2 μm and more preferably about 0.05 to 1 μm.

A second intermediate layer containing carbon black can optionally be provided on one of the surfaces of the intermediate layer containing an electroconductive polymer. If a second intermediate layer is used, it is necessary to select carbon black of a particle size which will not unduly reduce surface smoothness. In addition, the carbon black should be dispersed completely and uniformly in the layer, and the coating composition containing carbon black should be coated in an adequate thickness. Carbon black having an average primary particle size of about 10 to 100 mμ and preferably about 15 to 50 mμ are used for the purpose. The binder in the second intermediate layer can be any binder typically used for the preparation of a magnetic recording medium, although nitrocellulose and a vinyl chloride-vinyl acetate copolymers are preferred because of their good dispersibility. The amount of carbon black incorporated in the second intermediate layer is generally 2 to 50 wt% and preferably 5 to 20 wt% based on the weight of the second intermediate layer. The second intermediate layer has a dry thickness of about 0.05 to 3 μm and preferably about 0.1 to 1 μm.

It is preferred that the second intermediate layer containing carbon black is calendered before another layer such as a magnetic layer is applied.

In addition to the above layers, an underlayer may be provided between the support and the intermediate layers, using any conventional coating method. The binder and organic solvent used for such an underlayer can be any well-known binder and solvent, and they can be used alone or in combination.

The magnetic recording medium comprising an intermediate layer according to the present invention has low electric resistance on its magnetic recording layer surface, i.e., less than $1 \times 10^9$ Ω/sq, an excellent video S/N ratio, and reduced deterioration with the passage of time.

Magnetic particles, binders, solvents, lubricants, dispersing agents, abrasives and curing agents which are used in the magnetic recording layer of the present invention, and supports and methods for preparing the magnetic recording medium are disclosed in U.S. Pat. No. 4,135,016, and can be freely selected depending upon the purposes of the present invention.

The present invention is further illustrated in more detail by the following Examples. It will be easily understood by those skilled in this art that materials, quantities and volumes and operation processes can be changed so long as the gist of the present invention is not essentially changed. Accordingly, the present invention should not be construed as being limited to the following Examples. In Examples, all parts, ratios and percents are by weight, unless otherwise indicated.

EXAMPLE 1

A 32.5% aqueous solution of an electroconductive polymer which is commercially available as "ECR-34" (trade name) manufactured by Dow Chemical Co., Ltd. was prepared and was coated on a polyester support having a thickness of 12 μm to prepare an intermediate layer having a dry thickness of 0.5 μm. A composition having the formulation indicated below was mixed, kneaded and dispersed in a ball mill for 48 hours and was coated to form a magnetic layer on the thus-obtained intermediate layer in a dry thickness of 6 μm.

| | |
|---|---|
| Co—containing acicular γ-$Fe_2O_3$ (Co: Fe ratio 3:97; average particle size 0.3 μm × 0.03 μm) | 100 parts |
| Copolymer of vinyl chloride and vinyl acetate (mol ratio 90:10; molecular weight 20,000) | 10 parts |
| Polyurethane (molecular weight 70,000) | 5 parts |
| Polyisocyanate (molecular weight 656) | 4 parts |
| $Cr_2O_3$ (average particle size 0.6 μm) | 3 parts |
| Amyl stearate | 1 part |
| Amyl acetate | 300 parts |

Thus prepared magnetic recording tape was calendered to produce a surface smoothness of 0.01 μm and was slit to a width of ½ inch to prepare video tape Sample No. 1.

EXAMPLE 2

The coating composition for the intermediate layer used in Example 1 was replaced by the following formulation.

| | |
|---|---|
| Composition A | |
| Carbon black (primary average particle size: 30 mμ) | 2 parts |
| Vinyl chloride-vinyl acetate-vinyl alcohol copolymer (mol ratio 87:3:10; molecular weight 20,000) | 1 part |
| Methyl ethyl ketone | 30 parts |
| Composition B | |
| Electroconductive polymer (same as in Example 1) | 100 parts |
| Acetone | 30 parts |
| Isopropyl alcohol | 30 parts |

Composition A was mixed and kneaded for 30 min. using a three-roll mill, then the composition B was added, and mixed, kneaded and dispersed for an additional 15 min. After the viscosity of the composition was adjusted to 0.1 poises with acetone, the composition was coated to a dry thickness of 0.5 μm, having the same coating amount of the electroconductive polymer as that used in Example 1. Then the same procedure as in Example 1 was repeated to prepare Sample No. 2.

EXAMPLE 3

A coating composition having the following formulation was coated as an underlayer on a polyester support having a thickness of 12 μm in a dry thickness of 0.3 μm. An intermediate layer and a magnetic recording layer were provided thereon in the same manner as in Example 1 to prepare Sample No. 3, and in the same manner as in Example 2 to prepare Sample No. 4.

| | |
|---|---|
| Amorphous polyester resin | 10 parts |
| Polycarbonate | 3 parts |
| Methylene dichloride | 300 parts |

COMPARATIVE EXAMPLE 1

A coating composition having the following formulation was coated on a polyester support having a thickness of 12 μm to prepare an intermediate layer having a dry thickness of 0.5 μm, and a magnetic recording layer was provided thereon in the same manner as in Example 1 to prepare Sample No. 5.

| | |
|---|---|
| Carbon black (average particle size 100 μm) | 10 parts |
| Polyvinyl alcohol (molecular weight 15,000) | 8 parts |
| Methyl ethyl ketone | 100 parts |

COMPARATIVE EXAMPLE 2

The quarternary ammonium salt solution which is commercially available as "Cyastat SN" (trade name) manufactured by American Cyanamid Co., Ltd. was coated on a polyester support having a thickness of 12 μm in a dry thickness of 0.5 μm, and a magnetic recording layer was then provided in the same manner as in Example 1 to prepare Sample No. 6.

COMPARATIVE EXAMPLE 3

A coating composition having the following formulation was coated on a polyester support having a thickness of 12 μm to prepare an intermediate layer having a dry thickness of 0.5 μm, and a magnetic recording layer was provided thereon in the same manner as in Example 1 to prepare Sample No. 7.

| | |
|---|---|
| "Cyastat SN" (trade name) manufactured by American Cyanamid Co., Ltd. used in Comparative Example 2 | 100 parts |
| Polyvinyl formal (molecular weight 10,000) | 8 parts |
| Carbon black (average primary particle size: 30 mμ) | 10 parts |
| Methyl ethyl ketone | 100 parts |

COMPARATIVE EXAMPLE 4

A magnetic recording layer alone was provided on a polyester support having a thickness of 12 μm in the same manner as in Example 1 to prepare Sample No. 8.

The results of the evaluation described below of Sample Nos. 1 to 8 are shown in the following table.

TABLE

| | Sample No. | | | | | | | |
|---|---|---|---|---|---|---|---|---|
| | 1 | 2 | 3 | 4 | 5 | 6 | 7 | 8 |
| Intermediate layer | | | | | | | | |
| Electroconductive polymer | present | present | present | present | — | — | — | — |
| Carbon black | — | present | — | present | present | — | present | — |
| Quarternary ammonium salt | — | — | — | — | — | present | present | — |
| Underlayer | — | — | present | present | — | — | — | — |
| Evaluation | | | | | | | | |
| Surface electric resistance (Ω/sq) | $1 \times 10^8$ | $3 \times 10^4$ | $1 \times 10^8$ | $3 \times 10^4$ | $2 \times 10^7$ | $1 \times 10^8$ | $5 \times 10^6$ | $>1 \times 10^{10}$ |
| Video S/N (dB) (Initial value) | +1.0 | +0.7 | +0.7 | +0.7 | −1.5 | +0.5 | −5.0 | +1.0 |
| Video S/N Degree of deterioration (dB) | −0.2 | −0.1 | 0 | 0 | −0.2 | impossible to measure (head clogging) | −3 (head stain) | −0.2 |
| Peel strength of magnetic layer (g) | 80 | 85 | >200 | >200 | 75 | 30 | 25 | 30 |

The evaluations shown in the above table were conducted in the following manner.

Surface electric resistance was determined by charging both ends (length direction) of a piece (½ inch×½ inch) of the magnetic recording tape with alternating current of 100 V and measuring Ω/sq by a high resistance measuring device. As the value of surface electric resistance is reduced, the charge-preventing effect is increased. This evaluation was conducted using the magnetic recording tapes which had been allowed to stand at 60° C. and 30% relative humidity for one week and had made 100 passes on VTR.

Video S/N was determined by recording and reproducing white signals at a 50% gain on each magnetic tape sample using the above VTR. The initial P-P value of the noise for each sample, determined by comparison with a standard video tape (width ½ inch) produced by Fuji Photo Film Co., Ltd., is shown in terms of dB. After the magnetic tape samples were allowed to stand at 60° C. and 80% relative humidity for 3 days, the video S/N thereof was determined. The difference between the initial value and the value measured after 3 days is shown in the table as the degree of deterioration of video S/N. Negative values, corresponding to a large decrease in video S/N, indicate a high degree of deterioration.

The peel strength of the magnetic layer was measured by peeling off a cellophane adhesive tape, which was previously adhered to the magnetic layer, at an angle of 180° and is shown in grams.

The results in the Table show that Sample No. 1 according to the invention has excellent characteristics in each evaluation. Sample No. 2 containing both carbon black and the polymer of the present invention in the intermediate layer exhibits still lower surface electric resistance and is superior according to the other evaluations. Sample Nos. 3 and 4 which were provided with a subbing layer show markedly improved peel strength of the magnetic layer.

Sample No. 5 (comparative) containing carbon black in the intermediate layer but without the polymer according to the invention had reduced surface smoothness of the intermediate layer, and correspondingly reduced surface smoothness of the magnetic layer resulting in decreased video S/N.

Sample Nos. 6 and 7 (comparative) exhibit high video S/N deterioration, because the quarternary ammonium salt was exuded on the surface of the magnetic layer during the above described heat and humidity treatment of the tapes.

Sample No. 8 (control) having no intermediate layer exhibits a high surface electric resistance.

The experiments conducted show the clear superiority of the magnetic recording medium having an intermediate layer containing an electroconductive polymer according to the invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support, a magnetic recording layer containing ferromagnetic particles, and an intermediate layer provided therebetween, said intermediate layer containing an electroconductive polymer which is an ion-conductive high molecular electrolytic compound, a conjugated $\pi$ electron electron-conductive high molecular compound, or a charge transfer high molecular complex compound, wherein said electroconductive polymer is present in said intermediate layer in an amount of about 30 wt% or more, based on the weight of the intermediate layer and wherein said magnetic recording layer has a surface electric resistance of less than about $1 \times 10^9$ Ω/sq.

2. The magnetic recording medium claimed in claim 1, wherein said conjugated $\pi$ electron electron-conductive high molecular compound is polyacetylene.

3. The magnetic recording medium claimed in claim 1, wherein said charge transfer high molecular complex compound is selected from the group consisting of high molecular polycation 7,7,8,8-tetracyanoquinodimethane salt complex compounds, amino 7,7,8,8-tetracyanoquinodimethane complex compounds and pyridine 7,7,8,8-tetracyanoquinodimethane complex compounds.

4. The magnetic recording medium claimed in claim 1, wherein said electroconductive polymer is present in an amount of about 50 wt% or more based on the weight of the intermediate layer.

5. The magnetic recording medium claimed in claim 4, wherein said electroconductive polymer is present in an amount of from about 80 to 100 wt% based on the weight of the intermediate layer.

6. The magnetic recording medium claimed in claim 1, wherein said intermediate layer has a dry thickness of from about 0.005 to 5 μm.

7. The magnetic recording medium claimed in claim 6, wherein said intermediate layer has a dry thickness of from about 0.01 to 2 μm.

8. The magnetic recording medium claimed in claim 7, wherein said intermediate layer has a dry thickness of from about 0.05 to 1 μm.

9. The magnetic recording medium claimed in claim 1, wherein said magnetic recording medium further comprises a second intermediate layer containing carbon black having an average primary particle size of from about 10 to 100 mμ.

10. The magnetic recording medium claimed in claim 9, wherein said carbon black has an average primary particle size of from about 15 to 50 mμ.

11. The magnetic recording medium as claimed in claim 9, wherein said second intermediate layer has a dry thickness of from about 0.05 to 3 μm.

12. The magnetic recording medium claimed in claim 11, wherein said second intermediate layer has a dry thickness of from about 0.1 to 1 μm.

* * * * *